J. L. Kreider.
Corn Planter.
Nº 92,616. Patented July 13, 1869.
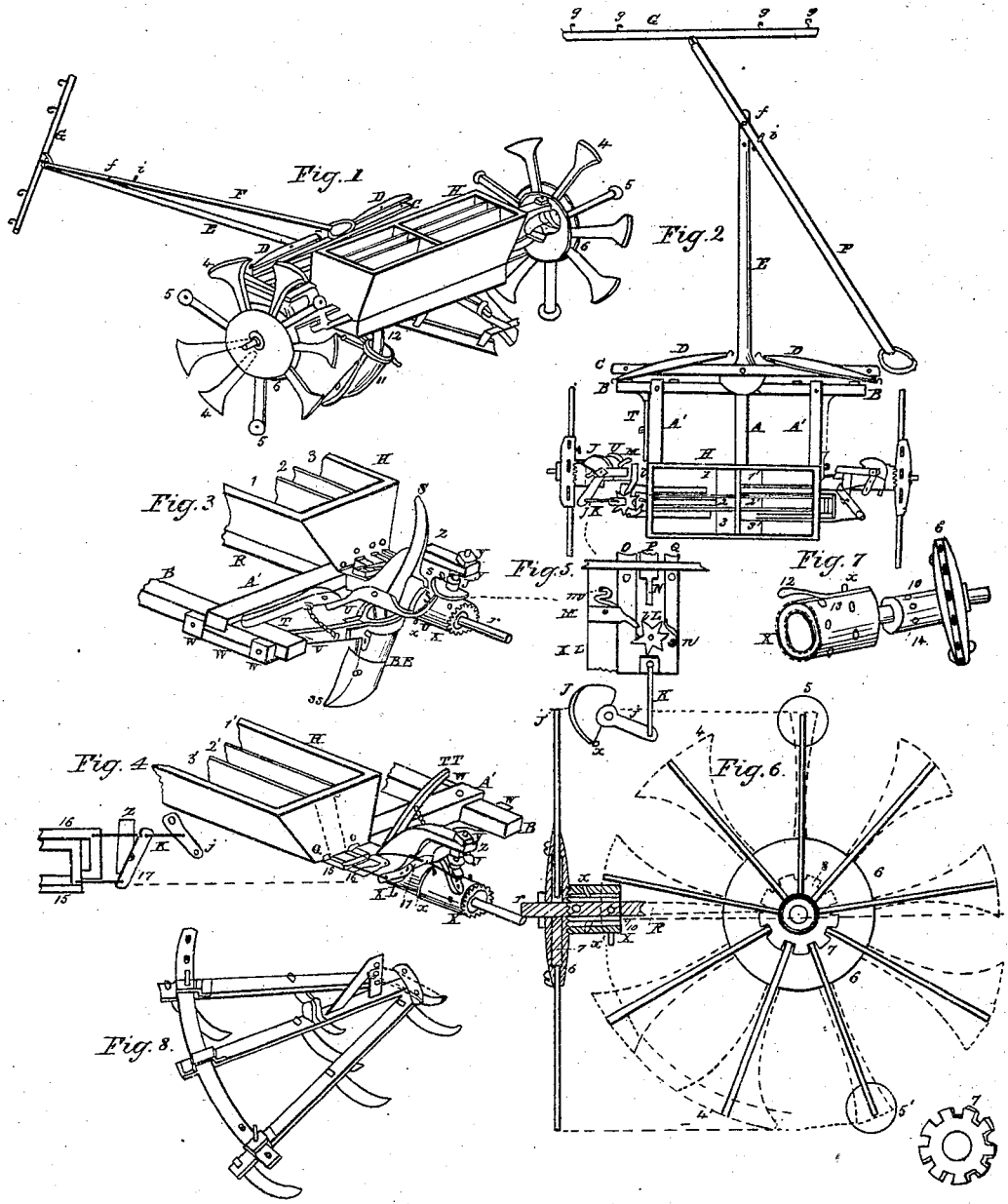
Witnesses
Jacob B. Group
Jacob Stauffer
Inventor
John L. Kreider

United States Patent Office.

JOHN L. KREIDER, OF CHESTNUT LEVEL, PENNSYLVANIA.

*Letters Patent No. 92,616, dated July 13, 1869.*

IMPROVEMENT IN AUTOMATIC CHECK-ROW CORN-PLANTER.

The Schedule referred to in these Letters Patent and making part of the same.

*To all whom it may concern:*

Be it known that I, JOHN L. KREIDER, of Chestnut Level, in the county of Lancaster, and State of Pennsylvania, have invented certain new and useful Improvements on Seed-Planters, constituting an automatic checker corn-planter, together with pumpkin-seed and phosphates, and the like; and I do hereby declare that the following is a clear and exact description of the construction and operation of the same, reference being had to the accompanying drawings, making a part of this specification, in which—

Figure 1 is a perspective view, with the hopper uncovered, showing one side, adapted for ordinary planting, the other side for hill-planting, and also pumpkin-seeds, with a scraper-attachment, to replace the scoring-shovels, or an ordinary shovel-harrow, when the machine is be used for cultivating the soil.

Figure 2 shows a vertical or plan view of the same.

Figure 3 illustrates the levers and appliances to operate the several valves, and for shifting and stopping their action.

Figure 4 is a modification of the same.

Figure 5 further illustrates the action of the valve for the pumpkin-seed chamber.

Figure 6 illustrates the hub-box, and mode of increasing the radius of the wheel, by means of a separate internal-notched ring, fitted around the axle-pipe, within the box of the hub.

Figure 7 shows a modification of the mode for adjusting the drum on the axle-pipe or sleeve.

Figure 8, an ordinary adjustable shovel-harrow, adapted, like the scraper, to be applied to the drag-bar of the machine.

The nature of my improvements consists in the mode of operating the action of the valves, to act in concert with the pulley-wheels on the rim of the wheels, or on the end of the spokes, so as to both compensate for loss or gain, and be governed by the furrow to regulate and automatically adjust itself, in dropping, by means of the furrow or scoring previously made by the machine, in a manner to produce or plant corn checker-fashion, equidistant apart,—by driving at right angles across the furrows; also, in the manner of guiding the machine so as to correct any irregularity in the walk of the horses attached, besides the adjustment of the drum on the axle, to arrange it to the slower or faster gait or walk of the horses employed in the work, in order that the seed is lodged at the proper time and place.

To enable others skilled in the art to make and use my invention, I will proceed to explain the several parts in their construction and operation.

The wheels have a hub-box, cast with a sleeve to fit around the spindle of the axle 6 10, and notches for the reception of the spokes. Centrally there is a space for the reception of an annular-notched disk, 7, to be used only when it is desirable to increase the radial length of the spokes 4 5, to separate or widen the distance between the hills.

Fig. 6 illustrates, by the upper half, this wheel without said ring 7, and the lower half, with it in place, and increased circumference of the wheel.

Every third spoke has a pulley-wheel or segmental wheel, (which, by its gravity, would be in the position, and would roll a half round, being sufficient to make the adjustment, which I deem an equivalent.)

These pulleys are so calculated as to strike the furrow, each as it comes under the spoke, when the latter is vertical.

The distance between the furrows being traversed by the spokes 4, with their widened tread, if a change of the soil, stone, or other impediment, would cause the pulley-spoke to come on the outer edge of the furrow, it would tend to carry that spoke either back or forward into the furrow, down the inclined sides, thereby governing the action of the valves, in unison with the vertical position of the respective spoke and pulley, which are calculated to strike the ground only in each furrow.

The drum X, which is a cylinder slipped over the sleeve 10, on the hub-box 6, is provided with two rows of pins, x, set alternating, so that the pins in one row are centrally opposite the space between the pins of the other row.

This drum is shown with notches, or teeth, to fit into corresponding notches in the hub-box, and secured by a set-screw, acting in a groove in the pipe, by which it is both held against and revolved with the hub-box and wheel, as well as adjusted by means of the set-screw.

Fig. 7 illustrates a more convenient mode for securing and adjusting the drum, by having a spring, 12, flush in a groove on the outer surface of the drum, and secured near the hub-box by a rivet, projecting forward with a thumb-and-finger hold, and provided with a pin, 13, on its under surface, so as to extend through the drum, and into a hole in the sleeve of the hub-box, so as to combine the two, by making a series of such holes in the sleeve aforesaid.

By means of the spring-catch, the drum, with its operating-pins, is readily adjusted, and is more convenient than a set-screw, as first shown.

A bearing, Z, over the axle, sustains a vertical shaft by means of screw-burrs Y Y.

On this suspended shaft or pivot is a half-moon cam, J, (with an arm, j,) over the pins X on the drum, in such a manner that the pins come alternately in contact on one side of the diameter, and then the other, so as to cause said cam to vibrate on its pivot-shaft, turning its arm j alternately to the right and left.

The rounded face of the cam in front causes it to rise upwards, when backing the machine, so as not to vibrate the arm that actuates the valves.

The compound levers T and U, for raising the drag-bar V and its appliances, also raises the cam J, when not desired to plant, as in going to or from the field.

As it is sufficient to drop pumpkin-seed only every other row, and, say, only to every sixth hill of corn, the pumpkin-seeder need only be attached to the one side of the machine, and operated every sixth action of the valves that drop the corn and fertilizers or phosphates.

The vacant chamber 2', on the other side of the hopper, will form a convenient tool-box.

The pumpkin-valve P, in the central chamber 2, is between but disconnected from the other valves O and Q, and is provided with a projecting tongue and lip.

The valves O and Q are united, outside, with a widened cross-piece, which supports a star-cam, L, of six points, (more or less, if desired.) One of said points is provided with a pin.

In connection with the star-cam, there is a click, M, bearing against the points, aided by a spring, $m$.

On the opposite side of said star-cam is also a spring, $n$, to prevent a retrograde movement.

The united cross-piece of both the valves O Q is connected, by a rod, K, with the lever-arm $j$ of the cam J aforesaid, operated by the pins on the drum X, pushing the combined valves in and drawing them out of the hopper-chambers, each motion causing the click to turn the star-cam one point, till that point comes under the tongue of the valve P, which has a pin.

This pin engages to the lip on the under side of the tongue, and draws the valve P out, when the click moves the point from under, and the next motion pushes the valve back again, where it remains stationary until the star-cam has made a revolution, when it again is drawn out by the pin and lip-connection. Thus, one motion is given to the valve P to every six of the combined valves O and Q.

Fig. 4 shows a modified arrangement of a double-valve action, without the pumpkin-seed valve between them. It consists in the use of two combined valves O Q, (or 15 and 16,) sliding in and out alternately, for single planting.

From the base of the bearing Z an arm extends, on which a vibrating lever, 17, is held centrally by a pivot, one end of which is connected to one pair of valves, and the other end to the second or other pair of valves, and derives its motion by being also connected by the inner end with the arm $j$ on the cam J, by a rod, K, as before, and operated by the drum X, in the manner explained.

The lever S, with its turned end $s$, is for the purpose of arresting the motion of the wheel, so arranged as to engage with a stop only when a pulley-spoke is vertical, so that in starting, or when turning, the machine travels on the pulley until brought in position in a furrow, in order to produce unity of action, or to correct any accidental error induced by peculiar circumstances, and to have more perfect control to insure regular action and uniformity in the distance of the hills, be the soil undulating or otherwise irregular from clods or stones.

In addition, I also provide a guide-lever pole, F, in connection with the ordinary rigid pole E, upon the end of which the guide-pole is secured by a pivot-bolt, $f$, upon which it turns.

To the projecting end of this guide-pole F the neck-yoke G is hung.

This pole is carried back, forming a long lever, with a handle for the driver, seated on the hopper-box, by which he can guide the rigid pole, so as to keep it in the true onward direction, however the horses may deviate to the right or left. Such deviation is readily counteracted by the lever-pole, and its action on the rigid or ordinary pole.

For the purpose of locking, so as to prevent the lever-pole from turning on its pivot, in driving to or from the field, it is only necessary to insert a headed pin, $i$, through both poles, which will arrest its turning.

The appliances for operating the valves can be readily removed with the scoring-shovels $s\ s$, bolted on the boot B B, through which the elastic spout conveys the grain in the ordinary manner.

The boot itself can also be detached from the drag-bar, and scrapers or cultivators fastened to them instead, for the several uses to which the machine may be put, as will readily suggest itself to every practical farmer.

I also show an elongated double-tree, C, with holes through the outer ends, so that the single-trees D can be put so far apart, and the adjustment made in the neck-yoke G, that two rows of furrows can be worked between the horses, in which case the middle shovel is removed from the harrow, fig. 8.

Should it be desirable to bring the wheels out of the furrow, and work the soil between the furrows, and so as to have only a single row between the horses, (in which case the middle shovel remains in the harrow, fig. 8,) it is only necessary to turn the box-hub on its long spindle, thereby reversing the wheels, bringing them closer together, when the machine is used for other purposes than for planting.

It is the desire to make the machine applicable to the several uses intimated, and is practically less complicated than would seem by the lengthy description.

The valves can be adjusted so as to drop between the furrows, if desirable.

I am aware that the boot, drag-bar, wooden-pin connections, cultivator, and scraper, slide-valves, and connecting-rods are not new, and employed in various combinations. Nor do I claim such, apart from what I deem new, such as the combined action of the adjustable drum and vibrating-cam arrangement, to operate two valves jointly, and the star-cam, click, and central valve, at certain fixed intervals, through the same agency that operates the combined single or double-slide valves, the self-adjusting spoke or wheel-pulleys, and extension-hub or spoke device, together with the guide-pole, for steering the machine, and mode of expanding the single-trees.

What I claim as my invention, and desire to secure by Letters Patent, is—

1. The pulley-wheel 5, or its equivalent, on the outer rim of a wheel or spoke, to adjust and regulate the same to the seeding or dropping-apparatus, by means of a mark or furrow, for checker-planting in or between the furrows.

2. The arrangement of the box-hub 6 with its sleeve 10, with or without the notched ring 7, for extending the radius of the spokes 4 5, in combination with the pulley-wheels, constructed substantially in the manner and for the purpose specified.

3. The arrangement of the drum X with its double row of pins $x$, in combination with the half-circular cam J, with its lever-arm $j$ and connecting-rod K, to operate the single or double pair of slide-valves O Q, in the manner and for the purpose set forth.

4. The star-cam L, in combination with the click M, springs $m\ n$, and valve P, with its tongue and lip operated by the joint action of the combined valves O Q, at certain fixed intervals, in the manner and for the purpose described.

5. The lever-guide pole F, when connected to the end of an ordinary rigid pole E, substantially in the manner and for the purpose specified.

JOHN L. KREIDER.

Witnesses:
JACOB D. GOMPF,
JACOB STAUFFER.